United States Patent
Kuroishi et al.

(10) Patent No.: US 8,171,968 B2
(45) Date of Patent: May 8, 2012

(54) TIRE FOR CONSTRUCTION VEHICLE

(75) Inventors: Kazuya Kuroishi, Kodaira (JP); Takumi Inoue, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 520 days.

(21) Appl. No.: 12/439,110

(22) PCT Filed: Jul. 27, 2007

(86) PCT No.: PCT/JP2007/064818
§ 371 (c)(1),
(2), (4) Date: Mar. 19, 2009

(87) PCT Pub. No.: WO2008/029563
PCT Pub. Date: Mar. 13, 2008

(65) Prior Publication Data
US 2010/0006197 A1   Jan. 14, 2010

(30) Foreign Application Priority Data
Sep. 5, 2006 (JP) ................................. 2006-240452

(51) Int. Cl.
*B60C 11/00* (2006.01)
(52) U.S. Cl. ........... 152/209.15; 152/209.1; 152/209.12; 152/209.14; 152/902
(58) Field of Classification Search ............... 152/209.1, 152/209.12, 209.15, 209.14, 902
See application file for complete search history.

(56) References Cited

U.S. PATENT DOCUMENTS
| | | | |
|---|---|---|---|
| 6,347,653 B1 | 2/2002 | Kobayashi | |
| 6,748,988 B2 | 6/2004 | Nakamura | |
| 2008/0289738 A1* | 11/2008 | Nakamura et al. | 152/209.24 |

FOREIGN PATENT DOCUMENTS
| | | |
|---|---|---|
| JP | 11-005411 A | 1/1999 |
| JP | 2000-233610 A | 8/2000 |
| JP | 2001-213120 A | 8/2001 |
| JP | 2002-248910 A | 9/2002 |
| JP | 2004-155335 A | 6/2004 |
| JP | 2004-224268 A | 8/2004 |
| JP | 2004-262295 A | 9/2004 |
| JP | 2007-145242 A | 6/2007 |
| JP | 2007-191093 A | 8/2007 |
| WO | 2006/013758 A1 | 2/2006 |

OTHER PUBLICATIONS
Translation of JP 2002-248910A.*

* cited by examiner

*Primary Examiner* — Matthew Daniels
*Assistant Examiner* — Jacob Thomas Minskey
(74) *Attorney, Agent, or Firm* — Sughrue Mion, PLLC (57) ABSTRACT

A construction vehicle tire, in which a temperature rise at the tread portion is suppressed by enhancing the heat radiation property at the tire center portion (C). Lug grooves (22) are arranged in the tread shoulder regions (S) on both sides in the tire width direction. The tire center portion (C) is formed with narrow grooves (24) extending substantially in the tire width direction (V) and having both ends terminating within the tread. A deep equatorial groove (26) extends in the tire circumferential direction on the tire equatorial plane (CL), and has a maximum depth within the range of from 70% to 110% of the depth of the lug grooves (22), so as to efficiently cool the bottom region (26B) of the deep equatorial groove (26) at high temperature.

6 Claims, 7 Drawing Sheets

TIRE FOR CONSTRUCTION VEHICLE

TECHNICAL FIELD

The present invention relates to a construction vehicle tire, which is capable of suppressing temperature rise in the tread portion.

BACKGROUND ART

There has been conventionally used a construction vehicle tire having a so-called lug pattern, wherein a number of lug grooves are arranged at a predetermined distance from each other. In such a construction vehicle tire, generally, a tread rubber having a high wear resistance is used in order to provide an improved wear resistance of the tire, and the tread volume is increased to increase the tread gauge and decrease the negative ratio, thereby to provide an improved stiffness at the land region.

However, when these measures are taken for improving the wear resistance of the tire, the temperature of the tread portion tends to further rise due to degraded heat generation property and increased heat generation value particularly upon rolling of the tire under a loaded condition. This sort of temperature rise in the tread portion is undesired from the viewpoint of preventing heat separation, etc., at the tread portion.

The tendency of the temperature rise is noticeable in particular at a land region with a small heat radiation area, when the land region is defined between two straight lines connecting the terminal ends of the lug grooves substantially in the tire circumferential direction and extending along the circumference of the tire.

As a countermeasure for coping with such a problem, there has been recently developed a technology that serves to minimize the decrease in the tread volume, minimize the lowering of the stiffness at the land region, and thereby provide an increased heat radiation area. This technology is featured by the provision of shallow circumferential grooves having a depth that is not larger than 25% of the depth of the lug groove, and a width that is within a range of approximately from 30 mm to 50 mm (refer, for example, to Patent Documents 1 and 2 identified below).

Patent Document 1: JP 2001-213120 A
Patent Document 2: JP 2000-233610 A

However, with the recent trend toward a large scale construction vehicle, and corresponding requirement for construction vehicle tires with increased tire size, low aspect ratio and increased duty load, there is even more significant tendency of the degraded heat generation property and the enhanced temperature rise at the tread portion. Thus, suppression of the temperature rise at the tire center portion is still a highly important task.

DISCLOSURE OF THE INVENTION

Problem to be Solved by the Invention

In consideration of the factual situation as explained above, therefore, it is an object of the present invention to provide a construction vehicle tire having an improved heat radiation property at the tire center portion and capable of suppressing the temperature rise at the tread portion.

Means for Solving the Problem

The inventor came to a recognition that the temperature of the tread portion is determined by the balance of the generated heat and radiated heat, and then considered that, if shallow grooves are formed in the tire center portion (for example, shallow grooves having a depth that is 10% to 25% of the lug groove depth, and a width within a range from 30 mm to 50 mm), it would be possible to mitigate the compressive stress acting to the tire center portion, and thereby suppress the temperature rise at the tire center portion.

The inventor further conceived formation of deep grooves at the tire center portion, instead of shallow grooves. If the depth of the groove is increased, it would be possible to heat the bottom region of the grooves to a higher temperature. If air stream is admitted to flow along the bottom region of the grooves at the higher temperature, it would be possible to radiate the heat highly efficiently. Furthermore, since the air flow volume is higher in the circumferential grooves than in the widthwise grooves, in the case of a comparable groove depth, the circumferential grooves provide a higher heat radiation effect than the widthwise grooves. Therefore, if deep grooves are formed in the tire center portion, the air stream flowing along the bottom region of such grooves can be effectively utilized to provide dramatically improved heat radiation.

Based on such recognition, the inventor conducted further review and repeated experiments to complete the present invention. According to a first aspect of the present invention, there is provided a construction vehicle tire wherein a plurality of lug grooves are arranged in tread shoulder regions on both sides of a tire center portion as seen in a tire width direction, said tire center portion comprising a plurality of widthwise grooves extending substantially along the wire width direction and having at least one end terminating in a tread portion, and a deep equatorial groove extending along a tire circumferential direction at least in a tire equatorial plane, said deep equatorial groove having a depth in its deepest part, which is within a range from 70% to 110% of a depth of the lug grooves.

As used herein, the phrase "extending substantially along the wire width direction" refers to the widthwise grooves that form an angle of not larger than 45°, relative to the tire width direction. The tread rubber comprises a rubber having predetermined characteristics. Furthermore, the phrase "in a tread portion" with respect to the terminal end of the lug grooves refers to a region that is situated on the inner side of the tread end as seen in the tire width direction. Here, the term "tread end" refers to an outermost ground contact edge in the tire width direction, in the case of a pneumatic tire that is installed to a standard rim as defined in the "JATMA YEAR BOOK" (Japan Automobile Tire Manufacturers Association Standard, Edition 2006), inflated by 100% of the air pressure (i.e., the maximum air pressure), which corresponds to the maximum load capacity (i.e., the load indicated by bold characters in the internal pressure-load capacity correspondence table) under applied size and ply rating as designated in the "JATMA YEAR BOOK", and loaded with the maximum load capacity. When the TRA standard or the ETRTO standard is alternatively applied depending on the territory of use or manufacture of the tire, the conditions follow such an alternative standard.

According to the first aspect of the present invention, as mentioned above, a deep equatorial groove is formed in the tire equatorial plane and has a groove bottom region that is heated to a higher temperature during the running, as compared to the shallow grooves. Air stream can be admitted during the running, into the groove bottom region at a high temperature so as to achieve efficient heat radiation. It is therefore possible to realize a construction vehicle tire having improved heat radiation property.

Moreover, the depth of the deep equatorial groove in its deepest part is within a range from 70% to 110% of the depth of the lug grooves. If it is smaller than 70%, the groove bottom region of the deep equatorial groove is not sufficiently heated to a high temperature, and it is thus difficult to achieve a satisfactory cooling effect. On the other hand, if it is larger than 110%, the tread gauge between the outermost belt layer and the groove depth region is excessively reduced, with an undesirable result that cracks at the groove bottom region tends to readily propagate up to the outermost belt layer.

According to a second aspect of the present invention, the depth of the equatorial groove is within a range from 70 mm to 200 mm.

In construction vehicle tires generally, the internal temperature of the tread rubber increases as it approaches the belt layer. Thus, if the depth of the deep equatorial groove is not less than 70 mm, the bottom region of the deep equatorial groove can be readily heated to a higher temperature. The second aspect of the present invention allows satisfactory cooling effect to be achieved by the air stream along the groove bottom region of the deep equatorial groove, which is caused during the running of the tire.

On the other hand, the deep equatorial groove with a depth larger than 200 mm is not practical due to the necessity for a tread gauge that must be correspondingly thick.

According to a third aspect of the present invention, the deep equatorial groove has a width that is within a range from 5 mm to 20 mm.

If the width of the deep equatorial groove is less than 5 mm, the cooling effect tends to be degraded since it is difficult for the air stream, which has been admitted into the groove by the running of the tire, to reach the bottom region of the groove due to the flow resistance of the sidewalls of the groove.

Furthermore, the deep equatorial groove is closed by the so-called compressive deformation of the rubber upon its contact with the ground so as to bear, in well balanced manner, the shearing stress acting to the tread portion during the rolling of the tire, thereby improving the wear resistance of the tire. However, if the width of the deep equatorial groove is larger than 20 mm, it is difficult to achieve such a functional effect.

By suitably designing the deep equatorial groove such that it has a width within the range from 5 mm t 20 mm, according to the third aspect of the present invention, it is possible to achieve a satisfactory cooling effect due to the provision of the deep equatorial groove, and to suppress degradation of the wear resistance due to the increased depth of the deep equatorial groove.

According to a fourth aspect of the present invention, the widthwise groove has a width that is within a range from 4 mm to 20 mm.

If the width of the widthwise groove is less than 4 mm, it is difficult to fully achieve the effect of improving the heat radiation property. On the other hand, if it exceeds 20 mm, the problem of uneven wear or tread deficit tends to occur due to the lowered block stiffness in the tread center region.

According to a fifth aspect of the present invention, the construction vehicle tire further comprises non-equatorial circumferential grooves extending in the tire circumferential direction along two straight lines connecting terminal ends of the lug grooves in the tire circumferential direction.

With this aspect of the present invention, it is possible to provide a tire having a sufficient side slip resistance, suppressing the lowering of the widthwise stiffness and yet minimizing the wear due to the side slipping, wherein the center portion of the tire can be maintained at sufficiently low temperature.

According to a sixth aspect of the present invention, the construction vehicle tire has a negative ratio in a 25% region of a tread width across the tire equatorial plane, and excluding said deep equatorial groove, wherein the negative ratio is within a range from 2% to 8%.

With this aspect of the present invention, the generated heat can be efficiently radiated without sacrifice of the wear resistance of the tire center portion.

According to a seventh aspect of the present invention, the depth of the deep equatorial groove varies in the tire circumferential direction.

With this aspect of the present invention, it is possible for the air stream, which has been admitted into the groove by the running of the tire, to be efficiently supplied into the widthwise grooves, so that the flow rate in the widthwise groove is significantly increased. Therefore, it is possible to effectively cool the tire center portion and suppress the temperature rise in the tread portion.

Effect of the Invention

According to the present invention, it is possible to improve the heat radiation property of the tire center portion, and to effectively suppress the temperature rise at the tire center portion.

REFERENCE NUMERALS

10 Construction vehicle tire
22 Lug grooves
24 Narrow widthwise grooves (widthwise grooves)
26 Deep equatorial groove
26B Groove bottom region
28 Narrow widthwise grooves
34 Narrow widthwise grooves (widthwise grooves)
46 Narrow non-equatorial groove
58 Deep equatorial groove 66 Deep equatorial groove
76 Deep equatorial groove
C Tire center portion
CL Tire equatorial plane
d Groove depth
GW Groove width
S Tread shoulder region
SW Tread shoulder width
W Tread width

BEST MODE FOR CARRYING OUT THE INVENTION

The present invention will be further described with reference to some preferred embodiments. It is noted that, with respect to the second and subsequent embodiments, the same reference numerals are used to denote the corresponding elements so as to eliminate overlapping description.

First Embodiment

Figure 1:
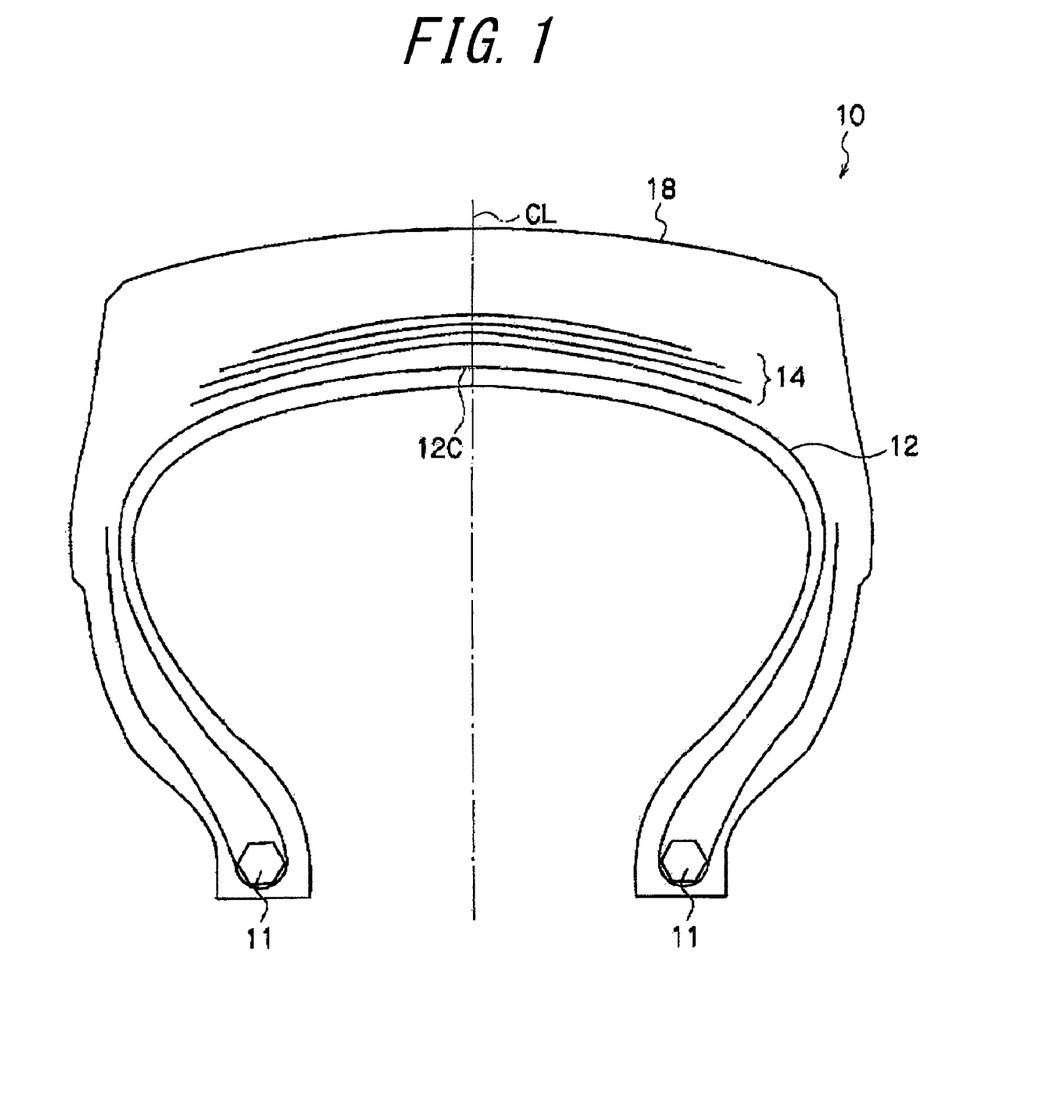
FIG. 1 is a radial sectional view of a construction vehicle tire according to a first embodiment of the present invention.

To begin with, a first embodiment of the present invention will be described below. As shown in FIG. 1, a construction vehicle tire 10 of the first embodiment includes a carcass 12 having both edges folded around the respective bead cores 11. The carcass 12 is comprised of a single or plural carcass plies.

On the radially outer side of the crown portion 12C of the carcass 12, there is embedded a belt 14 comprised of a plurality of belt layers, which are superimposed one above the other. On the radially outer side of the carcass 12, as shown in FIG. 1 and FIGS. 2(A) and 2(B), there is formed a tread portion 18 in which grooves are arranged. As the rubber forming the tread rubber, there is used a rubber having predetermined properties.

A plurality of lug grooves 22 are formed in the tread shoulder regions S on both sides in the tire width direction.

In the tire center portion C, a plurality of narrow widthwise grooves 24 are arranged so as to extend substantially along the tire width direction V. Here, the tire center portion C refers to a region that extends from the terminal ends of the lug grooves 22 on both sides in the tire width direction, toward the tire equatorial plane. Each narrow widthwise groove 24 has a widthwise inner end that terminates in the tread and a widthwise outer end that opens into the tip end of the lug groove 22. Furthermore, each lug groove 22 has a widthwise outer end that extends beyond the tread edge T, so as to allow draining of water toward the widthwise outside of the tire.

In the tire center portion C, furthermore, a deep equatorial groove 26 is arranged on the tire equatorial plane CL so as to extend in the tire circumferential direction, intersecting with the narrow widthwise grooves 24. The depth of the deep equatorial groove 26 at its deepest part is within a range from 70% to 110% of the width of the lug grooves 22. The depth d of the deep equatorial groove 26 is within a range from 70 mm to 200 mm.

As mentioned above, in the construction vehicle wheel 10, the deep equatorial groove 26 is arranged on the tire equatorial plane to extend in the tire circumferential direction. By this, air stream can be supplied by the running of the tire to reach the groove bottom region 26B, which is at a high temperature, so as to achieve an efficient cooling. As a result, the temperature rise of the tread portion 18 upon rolling of the loaded tire can be effectively suppressed, to realize a construction vehicle tire 10 capable of suppressing occurrence of tire troubles, such as heat separation.

Since the depth d of the deep equatorial groove 26 is within a range from 70 mm to 200 mm, the deep equatorial groove 26 can be formed in the tire gauge of a practical thickness, and the air stream can be supplied to the groove bottom region 26B of the deep equatorial groove 26 by the running of the tire, to thereby provide marked cooling effect.

Furthermore, since the depth of the deep equatorial groove 26 at its deepest part is within a range from 70% to 110% of the width of the lug grooves 22, marked cooling effect due to the provision of the deep equatorial groove 26 can be assured without propagation of cracks, such as groove bottom cracks, to the outermost belt layer.

Here, the width GW of the deep equatorial groove 26 is within a range from 5 mm to 20 mm. By this, sufficient cooling effect due to the provision of the deep equatorial groove 26 can be assured which suppressing lowering of the wear resistance as a result of enhanced depth of the deep equatorial groove 26.

With respect to the plurality of narrow widthwise grooves 24 arranged in the tire center portion C, since their inner ends terminate in the tread, it is possible to realize a tire with excellent traction performance, in which the lowering of the stiffness in the land region is suppressed, and the wear resistance is improved. Besides, it is possible to increase the number of the narrow widthwise grooves 24, or to arrange the narrow widthwise grooves 24 at locations remote from the lug grooves 22, where the temperature becomes the highest, thereby to provide an enhanced heat radiation performance.

The width SW of the narrow widthwise grooves 24 is set to a value within a range from 4 mm to 20 mm. By this, the effect of enhancing the heat radiation performance can be fully achieved.

Moreover, in a 25% region of the tread width W across the tire equatorial plane CL, excluding the deep equatorial groove 26, the tire has a negative ratio within a range from 2% to 8%. By this, the generated heat can be efficiently radiated, without sacrifice of the wear resistance in the tire center portion C. Here, the tread width W refers to the distance between the tread edges T on both sides in the tire width direction.

In construction vehicle tires generally, if the aspect ratio exceeds 90%, the belt tension increases and more heat is generated in the tread portion. In the construction vehicle tires according to the first embodiment, the aspect ratio is not larger than 90%. By this, the generated heat can be efficiently radiated without lowering the wear resistance at the tire center portion C.

In the first embodiment, furthermore, with reference to the correspondence table of the tire load capacity as defined in the yearbook of the TRA (The Tire and Rim Association, Inc.), the factor corresponding to the maximum speed is set to a value of not less than 1.4. By this, the load value relative to the unit tire air volume increases, and more heat is generated in the tread portion, so that the above-mentioned heat radiation effect plays even more important role.

Second Embodiment

Figure 3:
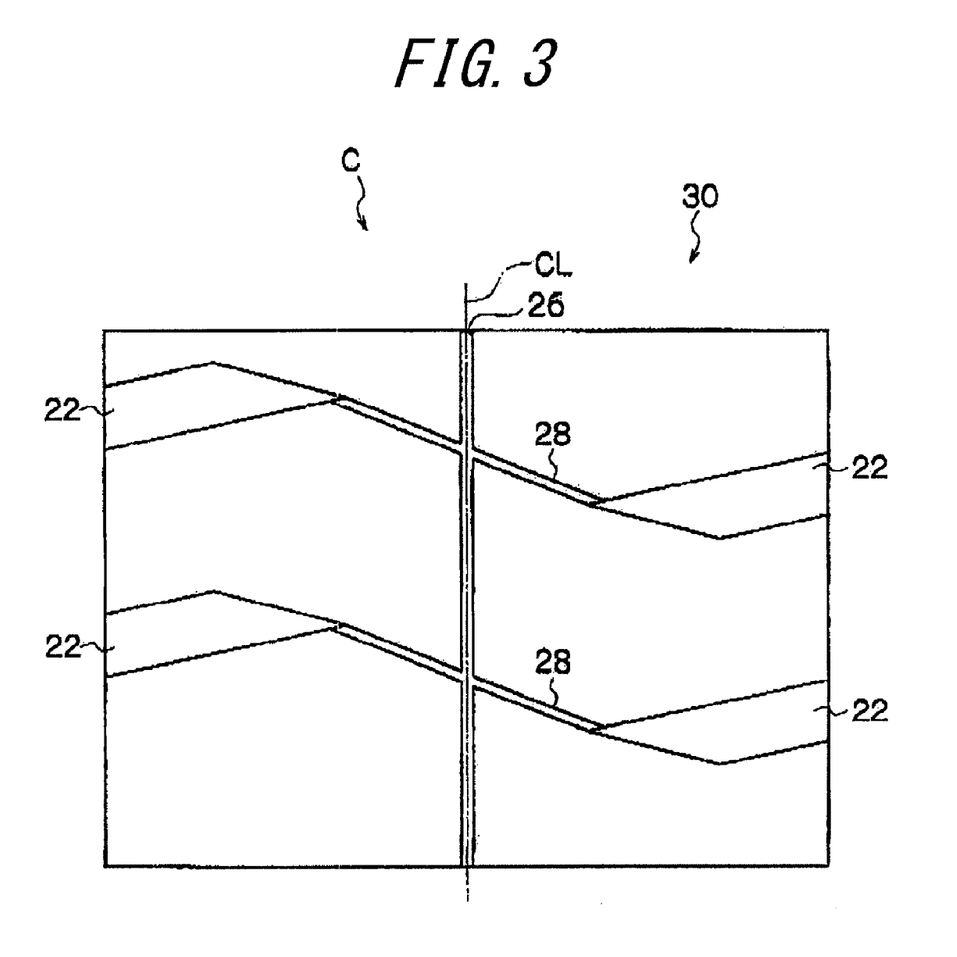
FIG. 3 is a plan view showing the tread pattern of the construction vehicle tire according to a second embodiment of the present invention.

A second embodiment of the present invention will be described below. In the construction vehicle tire according to the second embodiment, as compared to the first embodiment, instead of the narrow widthwise grooves 24, narrow widthwise grooves 28 as shown in FIG. 3 are formed in the tread portion 30.

Each narrow widthwise groove 28 has both ends connected to the lug grooves 22, and extends in the tire center portion C substantially along the tire width direction. The position of the lug grooves 22 is changed in order that the both ends of the narrow widthwise groove 28 can be connected to the lug grooves 22 in the manner described above.

According to the second embodiment, it is possible to provide a further enhanced heat radiation effect in the tire center portion, a higher stiffness of the land portion and an improved wear resistance.

Third Embodiment

Figure 4:
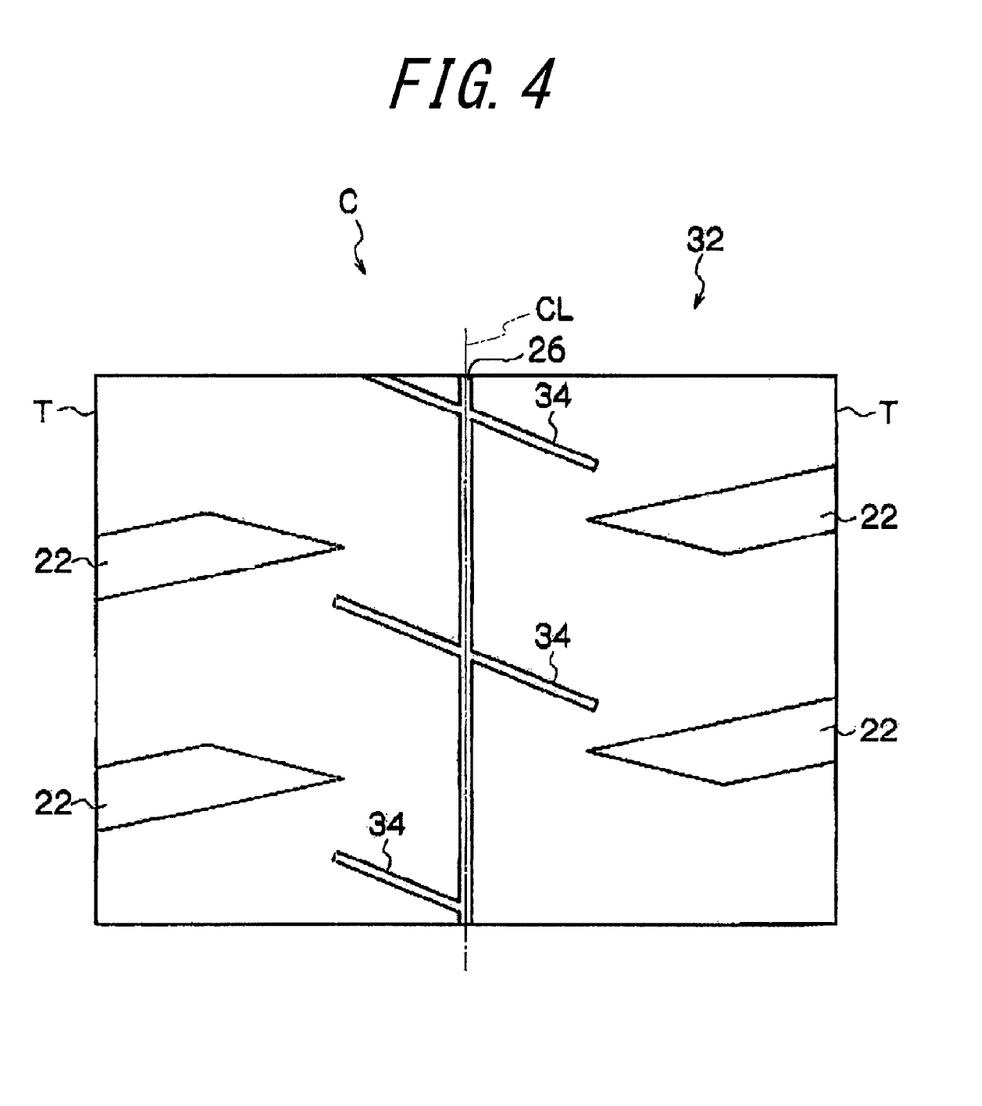
FIG. 4 is a plan view showing the tread pattern of the construction vehicle tire according to a third embodiment of the present invention.

A third embodiment of the present invention will be described below. In the construction vehicle tire according to the third embodiment, as compared to the first embodiment, instead of the narrow widthwise grooves 24, narrow widthwise grooves 34 as shown in FIG. 4 are formed in the tread portion 32.

The narrow widthwise grooves 34 are arranged in the tire center portion C and extend substantially along the tire width direction. Each narrow widthwise grooves 34 intersects with the deep equatorial groove 26, and has its both ends terminating in the tread without opening into the lug grooves 22.

Such an arrangement makes it possible to realize a construction vehicle tire highly effectively satisfying user's requirement for a large traction force. This is because if a large traction force acts on a tire, wherein the narrow widthwise grooves are connected to the lug grooves, as in the first embodiment, the narrow widthwise grooves and the lug grooves tend to exhibit different degree of deformation to cause a stress concentration at the junction, which may result in crack formation.

Fourth Embodiment

Figure 5:
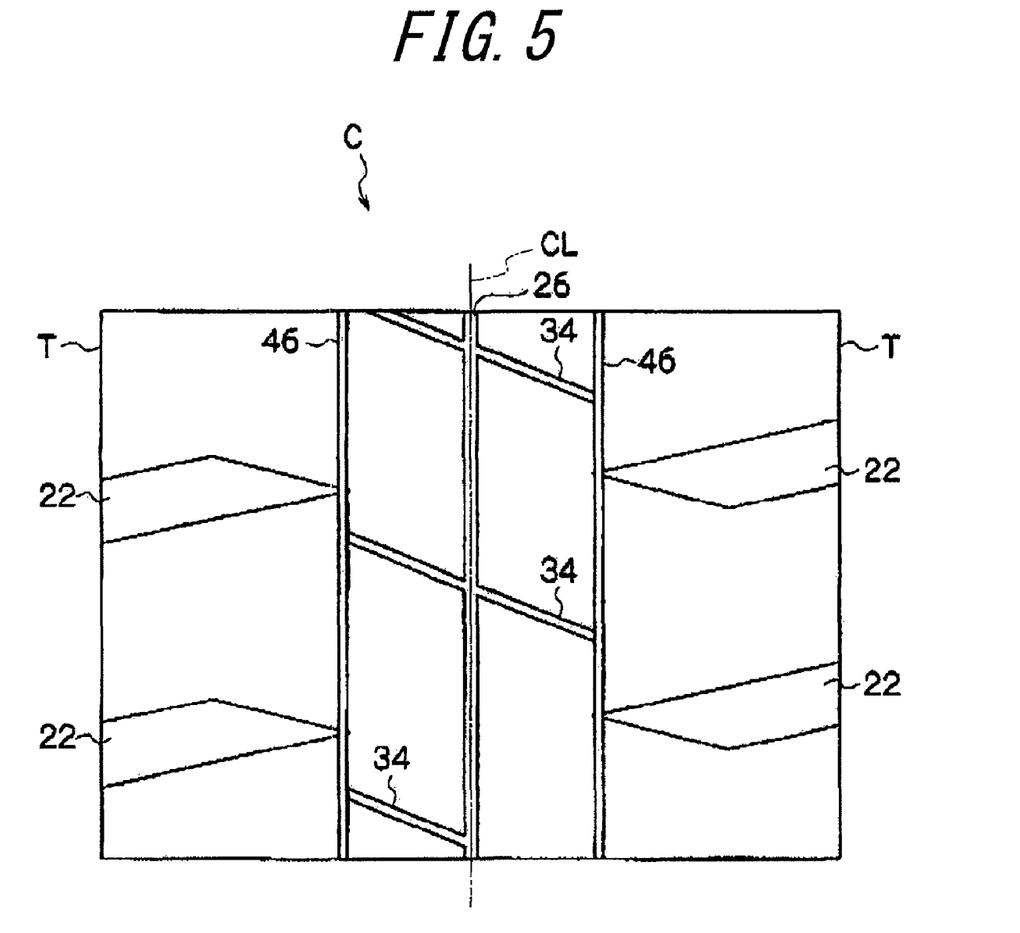
FIG. 5 is a plan view showing the tread pattern of the construction vehicle tire according to a fourth embodiment of the present invention.

A fourth embodiment of the present invention will be described below. In the construction vehicle tire according to the fourth embodiment, as compared to the third embodiment, there are further provided narrow non-equatorial grooves 46 as shown in FIG. 5, which extend in the tire circumferential direction along two straight lines connecting the terminal ends of the lug grooves 22 in the tire circumferential direction. The depth of the narrow non-equatorial grooves 46 is set to a value within a range from 10% to 25% of the depth of the lug grooves 22. In this instance, each narrow widthwise grooves 34 has its both ends connected to the narrow non-equatorial grooves 46.

According to the fourth embodiment, it is possible to preserve the required anti side slipping resistance, while suppressing the lowering of the stiffness in the width direction.

Fifth Embodiment

A fifth embodiment of the present invention will be described below. In the construction vehicle tire according to the fifth embodiment, as compared to the first embodiment, instead of the deep equatorial groove 28, a deep equatorial groove 58 as shown in FIGS. 6(A) to 6(C) is formed.

In the fifth embodiment, the deep equatorial groove 58 has a groove bottom region with a depth that changes in the tire circumferential direction. By this, at the bottom of the deep equatorial groove 58, the groove walls 27F, 27R of the narrow widthwise groove 24 on both sides, as seen in the tire circumferential direction, are different in height from each other in the sectional plane shown in FIG. 6(C). In other words, for each of the land regions that are separated from each other by the narrow widthwise grooves 24, the bottom of the deep equatorial groove 58 has inclination.

Such an arrangement makes it possible to efficiently supply the air stream into the narrow widthwise groove 24, as it is admitted to flow along the deep equatorial groove 58 by the rotation of the tire. Thus, it is possible to effectively air-cool the tire center portion C and suppress the temperature rise in the tread portion 18. The width and the depth of the deep equatorial groove 58 are suitably determined so that the temperature rise in the tire center portion C can be sufficiently suppressed from the brand new stage to the initial use stage of the tire, in which the heat generation in the tread portion 18 is significant.

Figure 6:
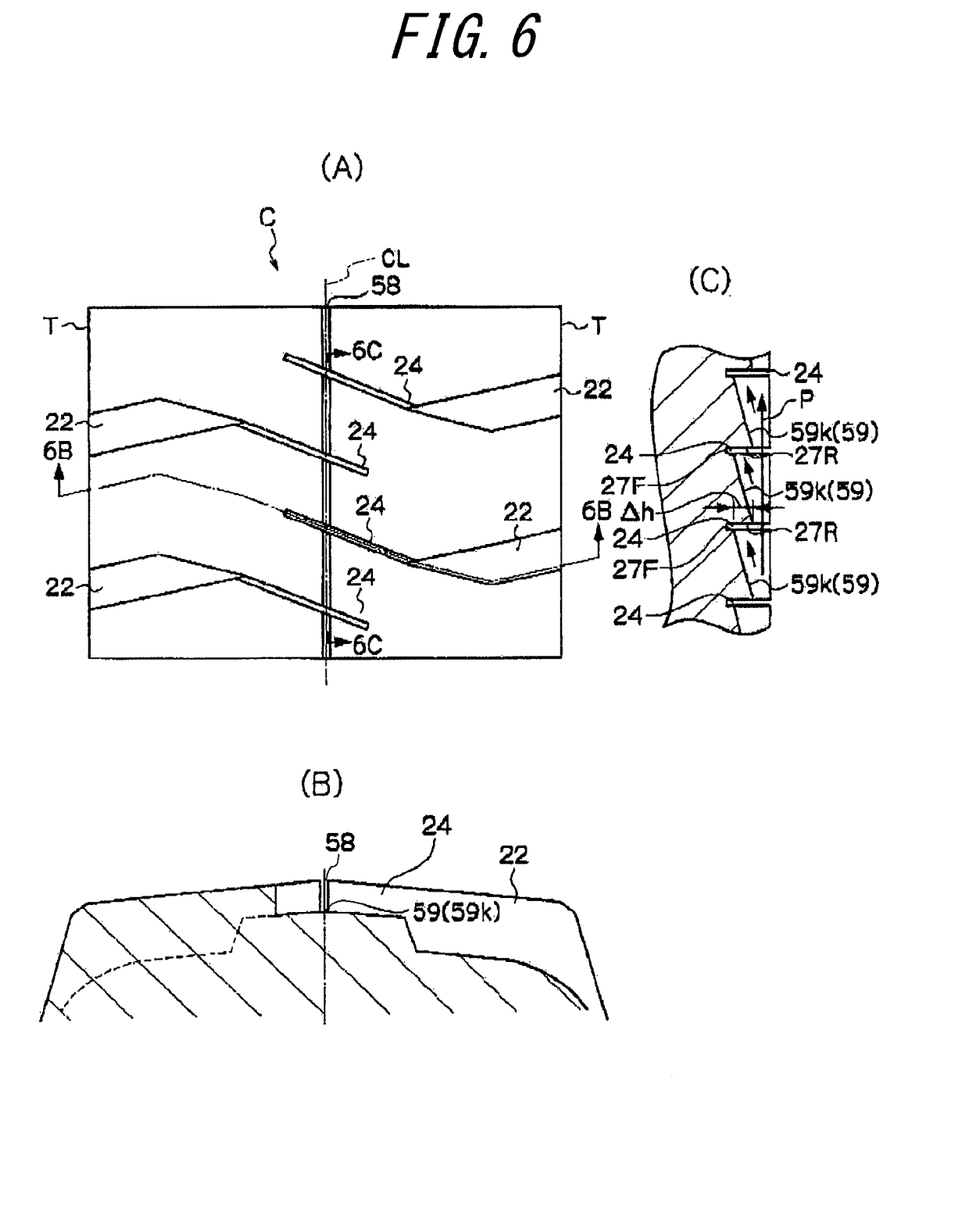
FIG. 6(A) is a plan view showing the tread pattern of the construction vehicle tire according to a fifth embodiment of the present invention.
FIG. 6(B) is a radial sectional views thereof, as seen in the direction of arrows 6B-6B.
FIG. 6(C) is a side sectional views thereof, as seen in the direction of arrows 6C-6C.

In connection with the narrow widthwise grooves 24, as shown in FIG. 6(C), the groove bottom surface between the neighboring narrow widthwise grooves 24, which are adjacent to each other in the tire circumferential direction, is formed as an inclined surface 59K. Thus, the groove wall 27R situated on the downstream side of the flow direction P of the air stream, which has been admitted into the deep equatorial groove 58 by the rotation of the tire, has a height that is larger than the height of the groove wall 27F on the upstream side, by an amount Ah. By this, the air stream impinging on the groove wall 27R can be readily diverted into the narrow widthwise grooves 24 to more significantly achieve the above-mentioned effects.

Moreover, the plurality of narrow widthwise grooves 24 arranged in the tire center portion C have their widthwise inner ends terminating within the tread. This arrangement makes it possible to realize a tire having an excellent traction performance and an improved wear resistance by suppressing the lowering of the stiffness in the land region. Besides, an improved heat radiation performance can be achieved by increasing the number of the narrow widthwise grooves 24, or arranging the narrow widthwise grooves 24 at locations remote from the lug grooves 22, where the temperature becomes the highest.

Figure 7:
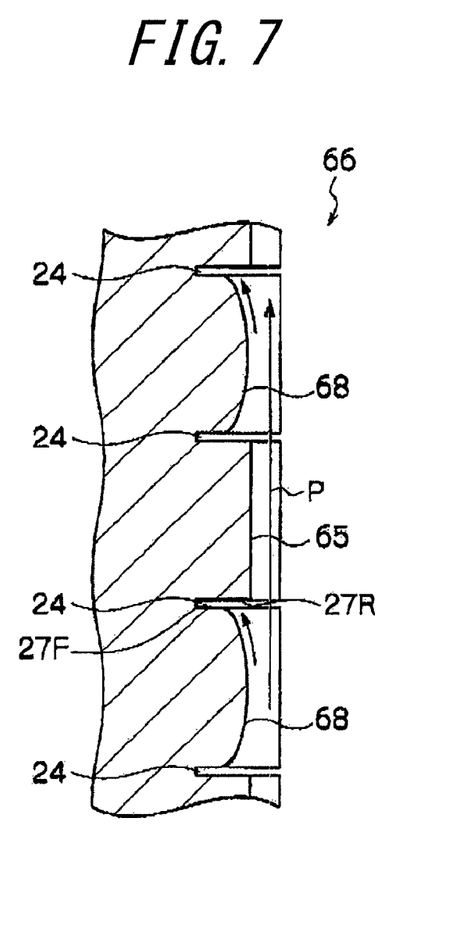
FIG. 7 is a sectional view showing a variant of the deep equatorial groove in the construction vehicle tire according to the fifth embodiment.
Figure 8:
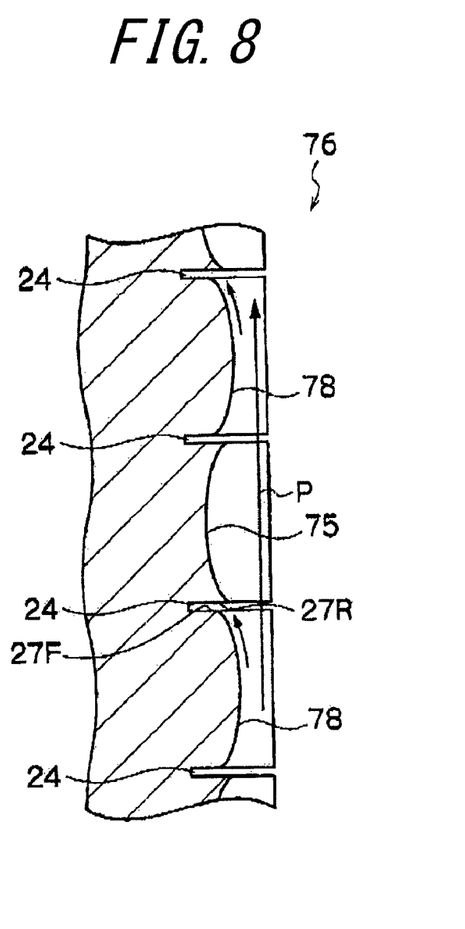
FIG. 8 is a sectional view showing another variant of the deep equatorial groove in the construction vehicle tire according to the fifth embodiment.

In the fifth embodiment, the deep equatorial groove 58 has been explained with reference to an example where the groove bottom surface is formed by an inclined surface. However, the groove bottom surface may have a different shape. Thus, as shown in FIG. 7, for example, there may be provided a deep equatorial groove 66 on the tire equatorial plane such that flat groove bottom surfaces 65 and curved and convex groove bottom surfaces 68 are arranged alternately with each other. Furthermore, as shown in FIG. 8, there may be provided a deep equatorial groove 76 on the tire equatorial plane such that curved concave groove bottom surfaces 75 and curved and convex groove bottom surfaces 78 are arranged alternately with each other. With these variants, the air stream impinging on the groove wall 27R (see, FIGS. 7 and 8) can be more readily diverted into the narrow widthwise grooves 24.

(Performance Evaluation Test)

In order to confirm the effects of the present invention, if any, the inventor conducted performance evaluation using test tires, including the pneumatic radial tire 10 according to the first embodiment (hereinafter, referred to as "example tire"), and a reference pneumatic radial tire (hereinafter, referred to as "comparative tire").

As compared to the example tire, the comparative tire is a tire in which the dimension of the grooves has been changed. The comparative tire is significantly different in that, instead of the deep equatorial groove 26 of the example tire, a shallow equatorial groove having a smaller depth and a larger width than the deep equatorial groove 26 is formed on the tire equatorial plane. As compared to a conventional pneumatic radial tire that is not formed with a shallow equatorial groove, the comparative tire provides a cooling effect for the tire center portion.

Figure 2:
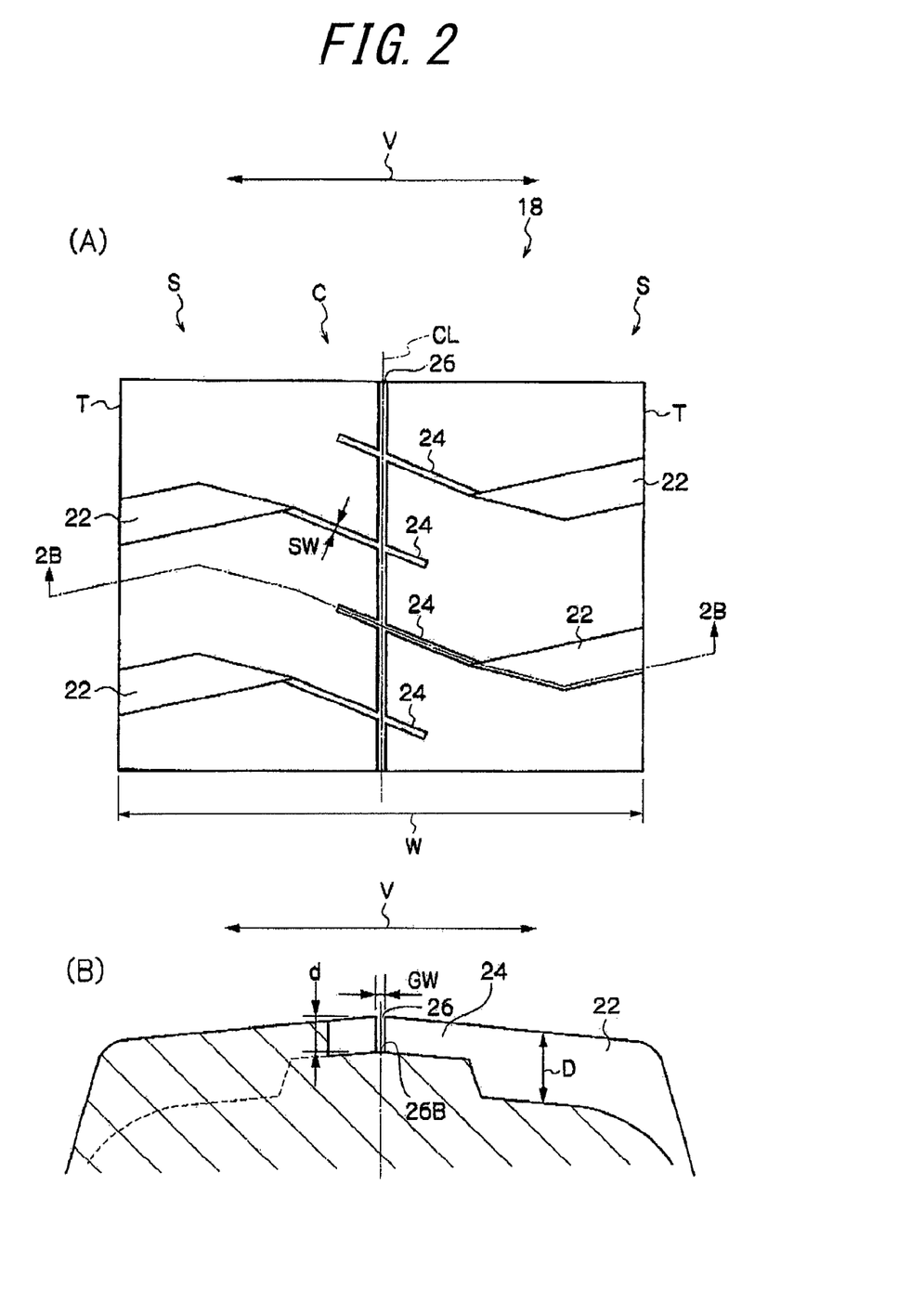
FIG. 2(A) is a plan view showing the tread pattern of the construction vehicle tire according to the first embodiment.
FIG. 2(B) is a diametrical sectional view thereof as seen in the direction of arrows 2B-2B.

The example tire and the comparative tire are both of the same tire size 40.00R57. The dimensional data of these tires is as shown in Table 1 below (for symbols GW, d, D and SW in Table 1, refer to FIG. 2).

TABLE 1

| | TEST TIRES | |
|---|---|---|
| | COMPARATIVE TIRE | EXAMPLE TIRE |
| Equatorial groove width (GW) | 40 mm | 14 mm |
| Equatorial groove depth (d) | 20 mm | 70 mm |
| Lug groove depth (D) | 97 mm | 97 mm |
| Negative ratio in the tire center portion | 5% | 1.80% |
| Narrow widthwise groove width (SW) in the tire center portion | 14 mm | 14 mm |
| Temperature (results of the first test) | (control temperature) | 7.8° C. lower than comparative tire |
| Wear resistance index (results of the second test) | 100 | 101 |

Two kinds of experiments were conducted with respect to the comparative tire and the example tire, after each being mounted on a TRA standard rim, inflated to a standard inner pressure, and subjected to a standard load.

Here, the term "standard rim" refers to a normal rim designated with respect to the applicable tire size, the term "standard load" refers to the maximum load for the applicable size and rating, and the term "standard load" refers to an air pressure corresponding to the maximum load, all being defined in the TRA Year Book 2006, for example. When the ETRTO standard is alternatively applicable depending on the territory of use or manufacture of the tire, the conditions follow such an alternative standard.

In the first experiment, the test tires were subjected to running for 24 hours, and thermocouples were then inserted into the test tires through narrow holes previously formed in the tire at six circumferential positions, to measure the temperature at locations 5 mm above the outermost belt layer, and calculate the average temperature for the six positions. The calculation results are also shown in Table 1. It can be seen from Table 1 that the average temperature for the example tire is 7.8° C. lower than that of the comparative tire, which means that the example tire has a better heat radiation performance.

In the second experiment, the test tires were mounted on a 190 ton dump truck and subjected to running at a substantially constant speed of 10 km/h for 1,000 hours. Then, at 8 positions on the tread evenly divided in the width direction, residual groove measurement was carried out to calculate the average value of the gauge required for the running, as the wear amount. Further, the wear amount was divided by the running time to obtain the wear resistance value. For the purpose of performance evaluating, the evaluation value for the comparative tire was defined as index 100, and the index for the relative evaluation value of the example tire was calculated. The calculated index is shown in Table 1. It is noted that the higher the index (wear resistance index), the better in performance. It can be seen from Table 1 that the example tire exhibits a higher wear resistance index, and a better wear resistance.

Although the present invention has been explained above with reference to specific embodiments, they have been presented by way of example only. Various modifications or changes may be made without departing from the scope of the present invention. It is needless to say that the scope of the present invention is not limited by these embodiments.

The invention claimed is:

1. A construction vehicle tire wherein a plurality of lug grooves are arranged in tread shoulder regions on both sides of a tire center portion of a tread as seen in a tire width direction, said tire center portion comprising:
    a plurality of widthwise grooves extending substantially along the tire width direction and having a first end terminating in a land portion of the tread and a second end opening into a respective lug groove, and
    a deep equatorial groove extending along a tire circumferential direction at least in a tire equatorial plane, said deep equatorial groove having a depth in its deepest part, which is within a range from 70% to 110% of a depth of the lug grooves.

2. A construction vehicle tire according to claim 1, wherein the depth of the equatorial groove is within a range from 70 mm to 200 mm.

3. A construction vehicle tire according to claim 1, wherein the deep equatorial groove has a width that is within a range from 5 mm to 20 mm.

4. A construction vehicle tire according to claim 1, wherein the widthwise groove has a width that is within a range from 4 mm to 20 mm.

5. A construction vehicle tire according to claim 1, wherein the tire has a negative ratio in a 25% region of a tread width across the tire equatorial plane; and excluding said deep equatorial groove, said negative ratio being within a range from 2% to 8%.

6. A construction vehicle tire according to claim 1, wherein the depth of the deep equatorial groove varies in the tire circumferential direction.

* * * * *